United States Patent
Chen et al.

(10) Patent No.: US 12,331,601 B2
(45) Date of Patent: Jun. 17, 2025

(54) DEVICE AND METHOD FOR CONTINUOUS MIXING OF SOLID DRAG REDUCER

(71) Applicant: PetroChina Company Ltd., Beijing (CN)

(72) Inventors: Pengfei Chen, Beijing (CN); Honggang Chang, Beijing (CN); Gang Xiong, Beijing (CN); Youquan Liu, Beijing (CN); Yadong Zhang, Beijing (CN); Chengmei Zhou, Beijing (CN); Jia Liao, Beijing (CN)

(73) Assignee: PetroChina Company Limited, Beijing (CN)

(*) Notice: Subject to any disclaimer, the term of this patent is extended or adjusted under 35 U.S.C. 154(b) by 735 days.

(21) Appl. No.: 17/546,098

(22) Filed: Dec. 9, 2021

(65) Prior Publication Data
US 2022/0098941 A1    Mar. 31, 2022

Related U.S. Application Data

(63) Continuation of application No. PCT/CN2021/070235, filed on Jan. 5, 2021.

(30) Foreign Application Priority Data

Jan. 8, 2020  (CN) .......................... 202010017709.8

(51) Int. Cl.
*E21B 21/00* (2006.01)
*B01F 21/20* (2022.01)
(Continued)

(52) U.S. Cl.
CPC ............ *E21B 21/062* (2013.01); *B01F 21/20* (2022.01); *B01F 35/2111* (2022.01);
(Continued)

(58) Field of Classification Search
CPC .. B01F 35/2111; B01F 21/20; B01F 2101/49; E21B 21/062; E21B 43/27
See application file for complete search history.

(56) References Cited

U.S. PATENT DOCUMENTS

| 5,190,374 A | 3/1993 | Harms et al. |
| 2013/0292122 A1* | 11/2013 | Nichols ................. E21B 21/062 166/308.1 |
| 2019/0264517 A1* | 8/2019 | Chong ................ B01F 35/7176 |

FOREIGN PATENT DOCUMENTS

| CN | 102518945 A | 6/2012 |
| CN | 103381339 A | 11/2013 |

(Continued)

OTHER PUBLICATIONS

Search Report issued on Feb. 25, 2022 for counterpart Russian patent application No. 2021128176.
(Continued)

*Primary Examiner* — Anshu Bhatia
(74) *Attorney, Agent, or Firm* — Weaver Austin Villeneuve & Sampson LLP

(57) ABSTRACT

The present disclosure relates to a device and method for continuous mixing of a solid drag reducer. The device for continuous mixing of a solid drag reducer comprises a raw material storage device (1), a pneumatic raw material delivery device (2), a power device (3), a flow testing device (4) and a dissolving device (5). The method for continuous mixing of a solid drag reducer uses the device for continuous mixing of a solid drag reducer, which can realize continuous mixing of the solid drag reducer during large-scale volume fracturing.

17 Claims, 1 Drawing Sheet

(51) Int. Cl.
*B01F 35/21* (2022.01)
*B01F 35/221* (2022.01)
*B01F 35/71* (2022.01)
*E21B 21/06* (2006.01)
*E21B 43/27* (2006.01)
*B01F 101/49* (2022.01)

(52) U.S. Cl.
CPC ........ *B01F 35/2211* (2022.01); *B01F 35/712* (2022.01); *B01F 35/71761* (2022.01); *E21B 43/27* (2020.05); *B01F 35/7181* (2022.01); *B01F 2101/49* (2022.01)

(56) References Cited

FOREIGN PATENT DOCUMENTS

| | | |
|---|---|---|
| CN | 203793663 U | 8/2014 |
| CN | 204957805 U | 1/2016 |
| CN | 106522910 A | 3/2017 |
| CN | 206199278 U | 5/2017 |
| CN | 206240477 U | 6/2017 |
| CN | 107152400 A | 9/2017 |
| CN | 107694458 A | 2/2018 |
| CN | 108339423 A | 7/2018 |
| CN | 208843792 U | 5/2019 |
| EA | 016279 B1 | 3/2012 |
| EA | 033586 B1 | 11/2019 |
| GB | 2338658 | * 10/2001 |
| RU | 2079353 C1 | 5/1997 |
| RU | 2445153 C2 | 3/2012 |
| WO | WO2006/136306 A1 | 12/2006 |

OTHER PUBLICATIONS

International search report issued for counterpart Chinese patent application No. PCT/CN2021/070235 Mar. 29, 2021.
First Office Action and search report issued on Oct. 26, 2021 for counterpart Chinese patent application No. 202010017709.8, along with EN translation.
Ma Baoqi et al., Principle and technology of oilfield chemistry, Petroleum Industry Press.

* cited by examiner

DEVICE AND METHOD FOR CONTINUOUS MIXING OF SOLID DRAG REDUCER

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates to the technical field of fracturing fluids and formulation of a fracturing fluid. More specifically, it relates to a device and method for continuous mixing of a solid drag reducer.

BACKGROUND

With the development of unconventional oil and gas represented by shale gas, hydraulic fracturing implemented with a large amount of fluid and a large displacement volume has increasingly become the main method for fracturing and production for unconventional oil and gas. Generally, for a shale gas horizontal well, about 30,000 $cm^3$ of fracturing fluid is used per well, and the operational displacement is about 14 $cm^3$ per minute. The traditional fluid formulating method using fluid tanks cannot meet the requirements of on-site operations, and a technique capable of continuously mixing fracturing fluids has become one of the key technologies in the development of unconventional oil and gas reservoirs.

At present, polyacrylamides are the main drag reducer used for fracturing for shale gas. The viscosity of such drag reducers increases upon exposure to water and heat, making it difficult to inject. For on-site operations, a continuous mixing truck is generally used for injection, or a drag reducer concentrate is formulated before hydraulic fracturing operations. When a continuous mixing truck is used, the operation pipeline connection is complex and the cost is high. When a drag reducer concentrate is formulated on a large scale before hydraulic fracturing operations, the requirements of on-site operations cannot be fulfilled, the workload increases due to pre-formulation, the dissolution performance of the drag reducer in the concentrate is poor, and agglomerates are easily formed.

Therefore, the present disclosure proposes a device and method for continuous mixing of a solid drag reducer to solve the above problems.

SUMMARY

The present disclosure aims to provide a device and method for continuous mixing of a solid drag reducer, so as to solve the problems that existing drag reducers cannot be continuously mixed, the operating cost is high when a continuous mixing truck is used, the pipelines are complex, and there is great limitation in preparing concentrates before hydraulic fracturing operations.

In order to achieve the above objective, the present disclosure adopts the following technical solution:
a device for continuous mixing of a solid drag reducer, comprising a raw material storage device, a pneumatic raw material delivery device, a power device, a flow testing device, and a dissolving device;
wherein the raw material storage device is connected to the pneumatic raw material delivery device, for supplying a solid drag reducer to the pneumatic raw material delivery device;
the pneumatic raw material delivery device is connected respectively to the raw material storage device, the power device, and the flow testing device, for delivering the solid drag reducer from the raw material storage device to the dissolving device with compressed air as a power source;
the dissolving device is connected to the flow testing device, for dissolving the solid drag reducer;
the power device is connected to the pneumatic raw material delivery device, for supplying compressed air as a power source to the pneumatic raw material delivery device;
the flow testing device is disposed between the pneumatic raw material delivery device and the dissolving device, for measuring the flow rate of the solid drag reducer delivered from the pneumatic raw material delivery device to the dissolving device, and adjusting the delivery rate of raw material from the pneumatic raw material delivery device according to the flow rate.

In some implementations, the device for continuous mixing of a solid drag reducer further comprises a sand mixing device connected to the dissolving device, and the sand mixing device is used to inject the solid drag reducer dissolved in the dissolving device to a reservoir to be fractured.

In some implementations, the device for continuous mixing of a solid drag reducer further comprises a water supply device connected to the dissolving device, and the water supply device is used to provide the dissolving device with water for dissolving the solid drag reducer.

In some implementations, the pneumatic raw material delivery device is connected to the raw material storage device via a first pipeline; the pneumatic raw material delivery device is connected to the power device via a second pipeline; the pneumatic raw material delivery device is connected to the flow testing device via a third pipeline; and the dissolving device is connected to the flow testing device via a fourth pipeline.

In some implementations, the first pipeline, the second pipeline, the third pipeline and the fourth pipeline are all made of transparent plastic.

In some implementations, the sand mixing device is connected to the dissolving device via a fifth pipeline, and the fifth pipeline is preferably made of stainless steel.

In some implementations, the dissolving device is connected to the water supply device via a sixth pipeline, and the sixth pipeline is preferably made of stainless steel.

In some implementations, the first pipeline has a pipe length of 0.2 m to 0.5 m, and a pipe diameter of 4 mm to 8 mm, preferably 5 mm.

In some implementations, the second pipeline has a pipe length of 1 m to 3 m, and a pipe diameter of 1 mm to 5 mm, preferably 3 mm.

In some implementations, the third pipeline has a pipe length of 1 m to 2 m, and a pipe diameter of 8 mm to 15 mm, preferably 10 mm.

In some implementations, the fourth pipeline has a pipe length of 2 m to 3 m, and a pipe diameter of 8 mm to 15 mm, preferably 10 mm.

In some implementations, the fifth pipeline has a pipe length of 10 m to 20 m, and a pipe diameter of 15 mm to 25 mm, preferably 20 mm.

In some implementations, the sixth pipeline has a pipe length of 1 m to 10 m, and a pipe diameter of 10 mm to 20 mm.

The pipe length and pipe diameter of the aforementioned pipelines provided according to the present disclosure are both optimal ranges obtained by aerodynamic calculations. If the pipelines are too long or have a too small pipe diameter, they tend to cause the problem of blockage in the pipeline delivery of the solid drag reducer. If the pipelines are too short or have a too large pipe diameter, it will be difficult to adjust the delivery rate of the solid drag reducer, resulting in problems such as waste of raw materials.

In some implementations, the pneumatic raw material delivery device is a centrifugal ventilator, a centrifugal blower, a turbo-type air compressor or a pneumatic diaphragm pump, more preferably a pneumatic diaphragm pump.

In some implementations, the pneumatic raw material delivery device is made of stainless steel, so as to avoid generation of rust which would degrade the performance of the drag reducer and cause operational failure.

In some implementations, the flow testing device includes a testing device and a display device.

In some implementations, the power device includes an air compressor.

In some implementations, the dissolving device is a gear pump, a plunger pump, a plunger pump or an emulsification pump; more preferably, an emulsification pump.

In some implementations, the inner wall of the cavity of the dissolving device is made of stainless steel.

In some implementations, the raw material storage device includes a conical funnel.

In some implementations, the sand mixing device includes a sand mixing vehicle.

The present disclosure further provides a method for continuous mixing of a solid drag reducer by using the above device, comprising the steps of:

adding a solid drag reducer to the raw material storage device; starting the power device to drive the operation of the pneumatic material delivery device; delivering the solid drag reducer from the raw material storage device to the dissolving device via the pneumatic raw material delivery device; by the flow testing device, measuring the flow rate of the solid drag reducer delivered between the pneumatic raw material delivery device and the dissolving device, and adjusting the delivery rate of raw material from the pneumatic raw material delivery device according to the flow rate; allowing the solid drag reducer to dissolve in the dissolving device, to complete the formulation of the solid drag reducer.

In some implementations, the maximum volume of the raw material storage device is 50 L.

In some implementations, the delivery rate of raw material provided by the pneumatic raw material delivery device is 1 kg/min to 10 kg/min.

In some implementations, the pressure provided by the power device is 5 kPa to 100 kPa. If the pressure provided by the power device is too low, it is not enough to start the pneumatic material delivery device, causing operational failure to the pneumatic material delivery device. If the pressure provided by the power device is too high, the service life of the pneumatic material delivery device will be shortened.

In some implementations, the measurement range of the flow testing device is 0 kg/min to 25 kg/min, and the flow testing device monitors online whether the delivery rate of the solid drag reducer meets the design requirements. If the flow rate is too small, it may lead to a poor resistance reduction performance, resulting in large friction during operations, or even operational failure. If the rate is too large, the amount of the drag reducer will exceed the designed value, which will waste raw materials and increase the cost.

In some implementations, the rotation speed of the dissolving device is 2000 r/min to 4000 r/min. If the rotation speed of the dissolving device is too low, the dissolving speed will not be enough to meet the requirements of on-site operations, and meanwhile the solid drag reducer will deposit in the cavity of the dissolving device, causing blockage. If the rotation speed is too low, the centrifugal force of the dissolving device will be small, resulting in a small suction force applied by the dissolving device to the solid drag reducer, which will cause deposition of the solid drag reducer and blockage at the pump port.

In some implementations, the maximum volume of the dissolving device is 5 L.

In some implementations, the solid drag reducer is a polyacrylamide-based drag reducer.

In some implementations, the solid drag reducer is an anionic polyacrylamide-based drag reducer, a cationic polyacrylamide-based drag reducer, a nonionic polyacrylamide-based drag reducer or an amphoteric polyacrylamide-based drag reducer.

In some implementations, the particle size of the solid drag reducer is 60 mesh to 100 mesh.

In some implementations, the dissolution time of the solid drag reducer in the dissolving device is not more than 60 sec.

In addition, unless otherwise specified, any range recorded in the present specification includes the end values and any values between the end values, and any sub-ranges defined by the end values or any values between the end values.

The Beneficial Effects of the Present Disclosure are as Follows.

The present disclosure provides a device for continuous mixing of a solid drag reducer, which allows continuous mixing of a solid drag reducer during large-scale volume fracturing without fish eyes. The device is a skid-supported device for on-site transportation, with simple connection and easy operation, as well as low cost in use. The device allows precise control of delivery of a solid drag reducer to meet the requirements of different displacements on site. The device can work continuously for 3 hours to 8 hours to meet the requirements of different operation times, thereby solving the problem of hardening and discontinuous delivery of a drag reducer due to the heat generated by a conventional screw pump. The device allows precise and real-time control of the concentration of the delivered solid drag reducer within a concentration range of 2 kg/min to 9 kg/min, with precision of ±0.1 kg/min. The solid drag reducer made by this device can realize continuous mixing.

DESCRIPTION OF DRAWINGS

Some specific embodiments according to the present disclosure will be described in further detail below with reference to the drawings.

Figure 1:
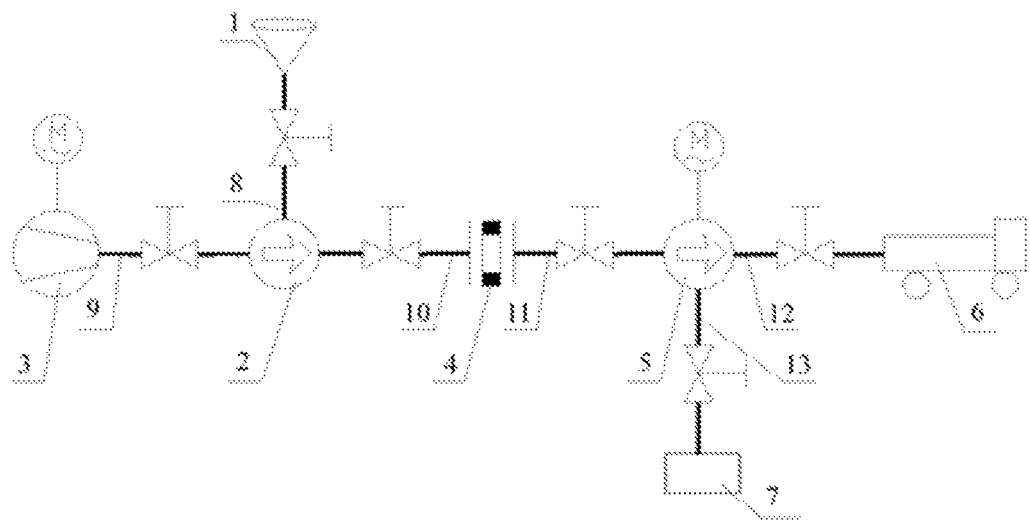
FIG. 1 shows a schematic representation of the device for continuous mixing of a solid drag reducer provided in Example 1 of the present disclosure.

References for main components:

1—raw material storage device, 2—pneumatic raw material delivery device, 3—power device, 4—flow testing device, 5—dissolving device, 6—sand mixing device, 7—water supply device, 8—first pipeline, 9—second pipeline, 10—third pipeline, 11—fourth pipeline, 12—fifth pipeline, 13—sixth pipeline.

DETAILED DESCRIPTION OF EMBODIMENTS

In order to explain the present disclosure more clearly, the present disclosure is further described hereinafter in conjunction with preferred embodiments. Those skilled in the art would understand that the contents described below are illustrative rather than restrictive, and should not be used to limit the scope of protection for the present disclosure.

In order to solve the problems that existing drag reducers cannot be continuously mixed, the operating cost is high when a continuous mixing truck is used, the pipelines are complex, and there is great limitation in preparing concentrates before hydraulic fracturing operations, the present disclosure provides a device for continuous mixing of a solid drag reducer with a reasonable design and a reliable working performance.

Specifically, referring to FIG. 1, there is provided a device for continuous mixing of a solid drag reducer, comprising a raw material storage device 1, a pneumatic raw material delivery device 2, a power device 3, a flow testing device 4 and a dissolving device 5;

wherein the raw material storage device 1 is connected to the pneumatic raw material delivery device 2, for supplying a solid drag reducer to the pneumatic raw material delivery device 2;

the pneumatic raw material delivery device 2 is connected respectively to the raw material storage device 1, the power device 3, and the flow testing device 4, for delivering the solid drag reducer in the raw material storage device 1 to the dissolving device 5 with compressed air as a power source;

the dissolving device 5 is connected to the flow testing device 4, for dissolving the solid drag reducer;

the power device 3 is connected to the pneumatic raw material delivery device 2, for supplying compressed air as a power source to the pneumatic raw material delivery device 2;

the flow testing device 4 is disposed between the pneumatic raw material delivery device 2 and the dissolving device 5, for measuring the flow rate of the solid drag reducer delivered from the pneumatic raw material delivery device 2 to the dissolving device 5 and adjusting the delivery rate of raw material from the pneumatic raw material delivery device 2 according to the flow rate.

The pneumatic raw material delivery device in the present disclosure uses the compressed air provided by the power device as power, and no heat is generated, which avoids dissolution of the solid drag reducer during its delivery. The flow testing device monitors the delivery flow of the solid drag reducer online, and can adjust the delivery rate of raw material from the pneumatic raw material delivery device according to the delivery flow, thereby avoiding the problems such as waste of raw materials caused by an excessively large flow, and a poor resistance reduction performance caused by an excessively small flow.

In addition, the device for continuous mixing of a solid drag reducer may further comprise a sand mixing device 6 connected to the dissolving device 5, and the sand mixing device 6 is used to inject the dissolved solid drag reducer to an oil/gas field.

Furthermore, the device for continuous mixing of a solid drag reducer may further comprise a water supply device 7 connected to the dissolving device 5, and the water supply device 7 is used to provide the dissolving device 5 with water for dissolving the solid drag reducer.

Specifically, the raw material storage device 1 includes a conical funnel; the pneumatic raw material delivery device is a centrifugal ventilator, a centrifugal blower, a turbo-type air compressor or a pneumatic diaphragm pump, more preferably a pneumatic diaphragm pump; the power device 3 includes an air compressor; the flow testing device 4 includes a testing device and a display device; the dissolving device 5 is a gear pump, a plunger pump, a plunger pump or an emulsification pump; more preferably, an emulsification pump; and the sand mixing device 6 includes a sand mixing vehicle.

In a preferred embodiment of the present disclosure, the pneumatic raw material delivery device 2 is made of stainless steel and the inner wall of the cavity of the dissolving device 5 is made of stainless steel, in order to avoid generation of rust which would cause a degraded performance of the drag reducer and operational failure.

In a preferred embodiment of the present disclosure, the maximum volume of the raw material storage device is 50 L. If the volume of the raw material storage device is too small, the solid drag reducer needs to be continuously supplemented during operations, which may cause interruptions in operations. If it is too large, the volume of the raw material storage device is large, which is disadvantageous to on-site operations and transportation, and correspondingly increases production cost.

In a preferred embodiment of the present disclosure, the measurement range of the flow testing device 4 is 0 kg/min to 25 kg/min, and the flow testing device monitors online whether the delivery rate of the solid drag reducer meets the design requirements. If the rate is too small, it may lead to a poor resistance reduction performance, resulting in large friction during operations, or even operational failure. If the rate is too large, the amount of the drag reducer will exceed the designed value, which will waste raw materials and increase the cost.

In a preferred embodiment of the present disclosure, the maximum capacity of the dissolving device is 5 L. If the capacity of the dissolving device is too small, continuous addition of the solid drag reducer to the device is needed, which requires high labor intensity, more workers and high cost. If the capacity of the dissolving device is too large, the skid-supported device will have a large volume, need a large area for transportation and installation, and cause inconvenient transportation and high cost.

In a preferred embodiment of the present disclosure, as shown in FIG. 1, the pneumatic raw material delivery device 2 is connected to the raw material storage device 1 via a first pipeline 8; the first pipeline 8 is preferably made of transparent plastic, has a pipe length of 0.2 m to 0.5 m, and a pipe diameter of 4 mm to 8 mm, preferably 5 mm;

the pneumatic raw material delivery device 2 is connected to the power device 3 via a second pipeline 9; the second pipeline 9 is preferably made of transparent plastic, has a pipe length of 1 m to 3 m, and a pipe diameter of 1 mm to 5 mm, preferably 3 mm;

the pneumatic raw material delivery device 2 is connected to the flow testing device 4 via a third pipeline 10; the third pipeline 10 is preferably made of transparent plastic, has a pipe length of 1 m to 2 m, and a pipe diameter of 8 mm to 15 mm, preferably 10 mm;

the dissolving device 5 is connected to the flow testing device 4 via a fourth pipeline 11; the fourth pipeline 11 is preferably made of transparent plastic, has a pipe length of 2 m to 3 m, and a pipe diameter of 8 mm to 15 mm, preferably 10 mm.

Furthermore, the sand mixing device 6 is connected to the dissolving device 5 via a fifth pipeline 12. The fifth pipeline 12 is made of plastic, has a pipe length of 10 m to 20 m, and a pipe diameter of 15 mm to 25 mm, preferably 20 mm.

Furthermore, the dissolving device 5 is connected to the water supply device 7 via a sixth pipeline 13. The sixth pipeline 13 is made of stainless steel, has a pipe length of 1 m to 20 m, and a pipe diameter of 10 mm to 20 mm, preferably 15 mm.

The pipe length and pipe diameter of the aforementioned pipelines are both optimal ranges obtained by aerodynamic calculations, which solve the problem of blockage in the pipelines by the solid drag reducer during transportation and failure of continuous mixing. Among the above pipelines, the first pipeline, the second pipeline, the third pipeline and the fourth pipeline are preferably made of transparent plastic, which not only facilitates disassembly, but also facilitates observation of the flowing state of the solid drag reducer. In addition, it should be understood that those skilled in the art can dispose valve(s) on each pipeline according to actual needs.

In another aspect of the present disclosure, the present disclosure also relates to continuous mixing of a solid drag reducer by using the device for continuous mixing of a solid drag reducer provided in FIG. 1, specifically comprising the following steps:

adding a solid drag reducer to the raw material storage device 1; starting the power device 3 to drive the operation of the pneumatic material delivery device 2; delivering the solid drag reducer from the raw material storage device 1 to the dissolving device 5 via the pneumatic raw material delivery device 2; by the flow testing device 4, measuring the flow rate of the solid drag reducer delivered between the pneumatic raw material delivery device 2 and the dissolving device 5, and adjusting the delivery rate of raw material from the pneumatic raw material delivery device 2 according to the flow rate; allowing the solid drag reducer to dissolve in the dissolving device 5, to complete the mixing of the solid drag reducer.

During the continuous mixing of the solid drag reducer as described above, in a preferred embodiment of the present disclosure, the delivery rate of raw material provided by the pneumatic raw material delivery device 2 is 1 kg/min to 10 kg/min in order to meet the requirements of on-site operations. During the delivery, such a delivery rate of raw material can meet the requirements of on-site operations, and a too large or too small rate cannot meet the requirements of mixing.

During the continuous mixing of the solid drag reducer as described above, in a preferred embodiment of the present disclosure, the pressure provided by the power device 3 is 5 kPa to 100 kPa. If the pressure provided by the power device is too low, it is not enough to start the pneumatic material delivery device, causing operational failure of the pneumatic material delivery device. If the pressure provided by the power unit is too high, the service life of the pneumatic material delivery device will be shortened.

During the continuous mixing of the solid drag reducer as described above, in a preferred embodiment of the present disclosure, the rotation speed of the dissolving device 5 is 2000 r/min to 4000 r/min. In addition, the dissolution time of the solid drag reducer in the dissolving device 5 is not more than 60 sec. If the rotation speed of the dissolving device is too low, the dissolving speed will not be enough to meet the requirements of on-site operations, and the solid drag reducer will also deposit in the cavity of the dissolving device, causing blockage. If the rotation speed is too low, the centrifugal force of the dissolving device will be small, resulting in a small suction force applied by the dissolving device to the solid drag reducer, which will cause deposition of the solid drag reducer and blockage at the pump port.

During the continuous mixing of the solid drag reducer as described above, in a preferred embodiment of the present disclosure, the solid drag reducer is a polyacrylamide-based drag reducer; further preferably, the solid drag reducer is an anionic polyacrylamide-based drag reducer, a cationic polyacrylamide-based drag reducer, a nonionic polyacrylamide-based drag reducer or an amphoteric polyacrylamide-based drag reducer. The particle size of the solid drag reducer is 60 mesh to 100 mesh.

In summary, the device for continuous mixing of a solid drag reducer provided by the present disclosure can run uninterrupted for up to 8 hours, so as to solve the problems that the existing drag reducers cannot be continuously mixed, the operational cost is high when a continuous mixing truck is used, the pipelines are complex, and there is great limitation in preparing concentrates before fracturing operations.

Obviously, the above-mentioned examples of the present disclosure are merely to clearly illustrate the present disclosure, and are not intended to limit the implementation of the present disclosure. For those of ordinary skill in the art, other changes or modifications in different forms can be made on the basis of the above description. Herein, it is not possible to give an exhaustive list of all embodiments. Any obvious changes or changes derived from the technical solutions of the present disclosure are still within the scope of protection for the present disclosure.

The invention claimed is:

1. A device for continuous mixing of a solid drag reducer, comprising a raw material storage device, a pneumatic raw material delivery device, a power device, a flow testing device, a dissolving device, and a water supply device, wherein:

the raw material storage device is for supplying a solid drag reducer to the pneumatic raw material delivery device;

the pneumatic raw material delivery device is connected respectively to the raw material storage device, the power device, and the flow testing device, for delivering the solid drag reducer in the raw material storage device to the dissolving device with compressed air as a power source;

the dissolving device is connected to the flow testing device, for dissolving the solid drag reducer;

the dissolving device is a gear pump, a plunger pump, or an emulsification pump;

the water supply device is connected to the dissolving device, and is used to provide the dissolving device with water for dissolving the solid drag reducer;

the power device is for supplying the compressed air as the power source to the pneumatic raw material delivery device;

the flow testing device is disposed between the pneumatic raw material delivery device and the dissolving device, for measuring a flow rate of the solid drag reducer delivered from the pneumatic raw material delivery device to the dissolving device and adjusting a delivery rate of raw material from the pneumatic raw material delivery device according to the flow rate;

the pneumatic raw material delivery device is connected to the raw material storage device via a first pipeline; the pneumatic raw material delivery device is connected to the power device via a second pipeline; the pneumatic raw material delivery device is connected to the flow testing device via a third pipeline; the dissolving device is connected to the flow testing device via a fourth pipeline; the dissolving device is connected to the water supply device via a sixth pipeline;

the first pipeline has a pipe length of 0.2 m to 0.5 m, and a pipe diameter of 4 mm to 8 mm; the second pipeline has a pipe length of 1 m to 3 m, and a pipe diameter of 1 mm to 5 mm; the third pipeline has a pipe length of 1 m to 2 m, and a pipe diameter of 8 mm to 15 mm; the fourth pipeline has a pipe length of 2 m to 3 m, and a pipe diameter of 8 mm to 15 mm; the sixth pipeline has a pipe length of 1 m to 10 m and a pipe diameter of 10 mm to 20 mm;

the pneumatic raw material delivery device includes a centrifugal ventilator, a centrifugal blower, a turbo-type air compressor, or a pneumatic diaphragm pump;

the power device includes an air compressor;

the flow testing device includes a testing device and a display device; and the device for continuous mixing of the solid drag reducer further comprises a sand mixing device connected to the dissolving device, wherein the sand mixing device is used to inject the solid drag reducer dissolved in the dissolving device into a reservoir to be fractured.

2. The device for continuous mixing of a solid drag reducer according to claim 1, wherein the first pipeline, the second pipeline, the third pipeline and the fourth pipeline are all made of transparent plastic.

3. The device for continuous mixing of a solid drag reducer according to claim 1, wherein the sand mixing device is connected to the dissolving device via a fifth pipeline; and the fifth pipeline has a pipe length of 10 m to 20 m and a pipe diameter of 15 mm to 25 mm.

4. The device for continuous mixing of a solid drag reducer according to claim 3, wherein the fifth pipeline is made of stainless steel.

5. The device for continuous mixing of a solid drag reducer according to claim 1, wherein the sixth pipeline is made of stainless steel.

6. The device for continuous mixing of a solid drag reducer according to claim 1, wherein the maximum volume of the raw material storage device is 50 L.

7. The device for continuous mixing of a solid drag reducer according to claim 1, wherein the measurement range of the flow testing device is 0 kg/min to 25 kg/min.

8. The device for continuous mixing of a solid drag reducer according to claim 1, wherein the maximum volume of the dissolving device is 5 L.

9. The device for continuous mixing of a solid drag reducer according to claim 1, wherein the pneumatic raw material delivery device is made of stainless steel.

10. The device for continuous mixing of a solid drag reducer according to claim 1, wherein the inner wall of a cavity of the dissolving device is made of stainless steel.

11. A method for continuous mixing of a solid drag reducer by using the device of claim 1, comprising the steps of:

adding a solid drag reducer to the raw material storage device;

starting the power device to drive the operation of the pneumatic raw material delivery device;

delivering the solid drag reducer from the raw material storage device to the dissolving device via the pneumatic raw material delivery device;

by the flow testing device, measuring the flow rate of the solid drag reducer delivered between the pneumatic raw material delivery device and the dissolving device, and adjusting the delivery rate of raw material from the pneumatic raw material delivery device according to the flow rate; and allowing the solid drag reducer to dissolve in the dissolving device to complete the mixing of the solid drag reducer.

12. The method for continuous mixing of a solid drag reducer according to claim 11, wherein the delivery rate of raw material from the pneumatic raw material delivery device is 1 kg/min to 10 kg/min.

13. The method for continuous mixing of a solid drag reducer according to claim 11, wherein the pressure provided by the power device is 5 kPa to 100 kPa.

14. The method for continuous mixing of a solid drag reducer according to claim 11, wherein the rotation speed of the dissolving device is 2000 r/min to 4000 r/min.

15. The method for continuous mixing of a solid drag reducer according to claim 11, wherein the dissolution time of the solid drag reducer in the dissolving device is not more than 60 sec.

16. The method for continuous mixing of a solid drag reducer according to claim 11, wherein the solid drag reducer is a polyacrylamide-based drag reducer.

17. The method for continuous mixing of a solid drag reducer according to claim 11, wherein the particle size of the solid drag reducer is 60 mesh to 100 mesh.

* * * * *